Patent

3,143,409
ADDUCT OF 3-p-CHLORO PHENYL, 1,1-DIMETH-YL-UREA AND A MIXTURE OF POLYCHLORO-BENZOIC ACIDS, USE AS HERBICIDAL AGENTS
Robert Earl Emond, Mooretown, Lambton, Ontario, Canada, assignor to Esso Research and Engineering Company, a corporation of Delaware
No Drawing. Filed July 2, 1958, Ser. No. 746,084
6 Claims. (Cl. 71—2.6)

The present invention relates to improved compositions for the control and destruction of weeds.

The use of herbicides to control the growth of vegetation for various purposes has become increasingly important. A variety of products have found application to control or eliminate plant growth on refinery firewalls, railroad and highway rights of way, drainage canals and various other locations where the presence of natural vegetation creates either a fire hazard or otherwise hinders the activities to which the particular area has been consigned.

One object of this invention is to provide a new chemical composition useful for herbicidal application.

Another object of this invention is to provide an effective herbicidal composition wherein the concentration of active herbicidal ingredients may be greatly reduced.

Another object of this invention is to provide an effective herbicidal composition characterized by selective weed control at extremely low concentrations of active ingredients.

Still another object of this invention is to provide an improved method for increasing the solubility of certain known herbicides in petroleum hydrocarbons.

These and other objects of the invention will be apparent to those skilled in the art from the description to follow:

The various known herbicides, of course, vary both with regard to the concentration required for effective control and with regard to the period of time wherein effective herbicidal activity is maintained.

It has been found that with the more effective herbicides known to the prior art concentrations of around 40 lbs. per acre must be employed if any appreciable degree of control is to carry over into a second growing season. Concentrations of approximately 20 lbs. or more per acre have been required where control is desired throughout a single growing season.

It now has been found that highly effective herbicidal activity can be achieved at much lower concentrations of the active herbicidal ingredients when 3-p-chlorophenyl-1,1-dimethyl urea is reacted with polychlorobenzoic acid. The herbicidal effect achieved by this product far exceeds the additive properties of the two reactants. This product may be employed with either water or mineral oil carriers. However, it has been found that a valuable synergistic effect is achieved if employed in cut-back asphalt. When cut-back asphalt is employed with this herbicide, tests have shown that not only is the immediate herbicidal activity superior, but the effective period of control is much longer also.

3-p-chlorophenyl-1,1-dimethyl urea is a commercial product which has been known in the trade as C.M.U. For purposes of simplification this product will hereinafter be referred to as C.M.U.

C.M.U. is one of a series of substituted urea compounds and has proven to be one of the more effective herbicidal compounds known to the art. It is a crystalline (plate-like) substance having a melting point of 338–340° F. and a molecular weight of about 198.

C.M.U. is slightly soluble in water, i.e., 230 p.p.m. at 77° F., more soluble in warm alcohol and substantially insoluble in heavy aromatic naphtha. It is considered an effective soil sterilant when employed at rates of 40 lbs. per acre for eliminating vegetation such as twitch grass. When employed at rates of 20 lbs. per acre, C.M.U. controls vegetation fairly effectively for one year, but if used in quantities of less than 15 lbs. per acre its effectiveness as a soil sterilant is negligible.

Chlorinated benzoic acids also have been evaluated for herbicidal activity. Polychlorobenzoic acid is commercially available as a mixture of isomers having an average melting point of 180° F. and an average molecular weight of about 200. This amorphous substance consists chiefly of 2,5-dichloro, 2,3,5-trichloro, 2,3,4,5- and 2,3,5,6-tetrachlorobenzoic acids. For purposes of simplification, this product will hereinafter be referred to as P.C.B.A. This product available in flakes is relatively soluble in heavy aromatic naphtha, e.g., 20 gms./100 gms. solution. The solubility of P.C.B.A. increases with the aromatic content of the hydrocarbon solvent. P.C.B.A. is ineffective as a herbicide when employed as an aqueous dispersion at rates up to 50 lbs. P.C.B.A. per acre. When cut-back asphalt is used as the carrier, P.C.B.A. is still relatively ineffective at rates of 16 lbs. per acre but will give up to 45% weed control when a rate of 32 lbs. per acre is employed.

It now has been found that the solubility of C.M.U. in an aromatic solvent can be greatly increased by using P.C.B.A. as an intermediate solvent.

When equal amounts of C.M.U. and P.C.B.A. are heated to about 180° F. and thoroughly mixed, a chemical reaction is initiated. The reception product is believed to be a new composition of matter. When this product is allowed to cool, it takes the form of an amorphous solid having a melting point of 170° F.

One of the important problems in cereal crop production is the control of wild oats. It now has been found that the C.M.U.-P.C.B.A. reaction product exhibits selective herbicidal properties toward wild oats as compared to its effect on cultivated oats and wheat when employed at extremely low concentration rates, i.e., in the range of 0.08 to 3.0 lbs. per acre.

The following examples illustrate the preparation of the new compound derived from C.M.U. and P.C.B.A. and demonstrate the relative effectiveness of the herbicidal compositions herein discussed.

EXAMPLE I

One sample of C.M.U. was tested for solubility in an aromatic fraction extracted by silica gel from a catalytically cracked gas oil having a boiling range of 400° to 650° F. and another sample of C.M.U. was tested for its solubility in heavy aromatic naphtha, a solvent having a boiling range of 328° to 540° F. and containing 85% aromatics. C.M.U. was found to be virtually insoluble in both of these aromatic solvents at temperatures up to 170° F.

EXAMPLE II

A sample of P.C.B.A. was tested for solubility in the heavy aromatic naphtha of Example I. Twenty grams of P.C.B.A. dissolved in 100 grams of the solvent at 77° F.

EXAMPLE III

Equal quantities of C.M.U. and P.C.B.A. were thoroughly mixed together at room temperature and the mixture was tested for solubility in the heavy aromatic naphtha of Example I. Seven grams of the mixture dissolved in 100 grams of the solvent at 77° F.

EXAMPLE IV

Two (2.0) grams of P.C.B.A. were melted at 180° F. To this liquid was added 2.0 grams of C.M.U. At this temperature the two substances were miscible. The reaction mixture was allowed to stand and upon cooling produced an amorphous solid. This solid was then tested and found to have a melting point of 170° F.

A quantitative analysis of the new substance was made and its composition was revealed to be as follows:

|  | Wt. percent |
|---|---|
| Carbon | 55.4 |
| Hydrogen | 5.4 |
| Nitrogen | 12.4 |
| Chlorine | 15.4 |
| Oxygen (by difference) | 11.4 |

This substance was tested for solubility in the heavy aromatic naphtha of Example I. 19 grams of the new compound dissolved in 100 grams of this solvent at 77° F.

The molecular weight of the new compound was determined by the conventional boiling point method using para dioxane as the solvent and the new substance was found to have a molecular weight of 326.

EXAMPLE V

A supersaturated solution of the C.M.U.-P.C.B.A. derived compound described in Example IV was formed in the heavy aromatic naphtha of Example I. Microscopic examination of the residue revealed needle-like crystals 500 microns long and 5 microns in diameter.

EXAMPLE VI

Field experiments were conducted with aqueous suspensions of C.M.U., P.C.B.A. and the C.M.U.-P.C.B.A. derivative described in Example IV. Additional tests were made with liquid asphalt solutions of P.C.B.A. and the aforesaid C.M.U.-P.C.B.A. derivative. In preparing this derivative the P.C.B.A. was melted at 180° F. and an equal amount of C.M.U. was added. The two compounds completely miscible at this temperature were subsequently added to the carrier solvent. The treatments were applied to plots (10' x 10') of vegetation consisting of twitch grass, thistle, plantain, and wild carrot. The herbicidal effect was evaluated for each of the several combinations and the results obtained are set forth in Table I.

Table I

| Treatment | | | | Percent Control of Vegetation [1] | |
|---|---|---|---|---|---|
| Chemical | Rate, Lbs./Acre | Carrier | | (After 2 mos.) | (After 4 mos.) |
| | | Type | Rate, Gal./Acre | | |
| C.M.U. | 40 | Water | 1,600 | 100 | |
| C.M.U. | 20 | do | 1,600 | 90 | |
| C.M.U. | 10 | do | 1,600 | 75 | |
| C.M.U. | 8 | do | 1,600 | 50 | 50 |
| C.M.U. | 5 | do | 1,600 | 17 | |
| C.M.U. | 1 | do | 1,600 | 0 | |
| P.C.B.A. | 50 | do | 1,600 | 0 | 0 |
| P.C.B.A. | 32 | do | 1,600 | 0 | 0 |
| P.C.B.A. | 16 | do | 1,600 | 0 | 0 |
| P.C.B.A. | 50 | Liquid Asphalt | 1,600 | 78 | 60 |
| P.C.B.A. | 32 | do | 1,600 | 75 | 45 |
| P.C.B.A. | 16 | do | 1,600 | 23 | 10 |
| C.M.U.-P.C.B.A. Derivative | 8}16 8} | Water | 1,600 | 93 | 95 |
| Do | 4}8 4} | do | 1,600 | 33 | 33 |
| Do | 8}16 8} | Liquid Asphalt | 1,600 | 100 | 100 |
| Do | 4}8 4} | do | 1,600 | 82 | 68 |
| Untreated Control | | | | 0 | 0 |
| Liquid Asphalt, 1,600 gal./acre | | | | 17 | 8 |

[1] Average of three replicates.
Liquid asphalt is a fluid asphalt made from 55% 85-100 penetration patch (112° F. softening point) with 45% straight run naphtha to give a Saybolt furol viscosity of 48 at 77° F.

EXAMPLE VII

Low concentrations of the C.M.U.-P.C.B.A. derived compound described in Example IV were tested for selective herbicidal properties.

In this test seven flats (1' x 2') were sown with 25 seeds each of wild oats, cultivated oats and wheat. After one day, the soil surface of each plot was sprayed with 13.6 grams (a rate of 65 gals. per acre) of a gas oil solution containing the above referred to C.M.U.-P.C.B.A. composition. The oil used was a catalytically cracked gas oil having a gravity of 23° API, and a distillate range of 442° to 596° F. This oil contains 65% aromatic hydrocarbons as measured by the silica gel adsorption method.

The amount of the herbicide in the spray was varied from .02 to 6 grams per flat (equivalent to 0.08 lb. to 2.6 lbs. per acre of active ingredient). The results of these tests are summarized in FIGURE 1.

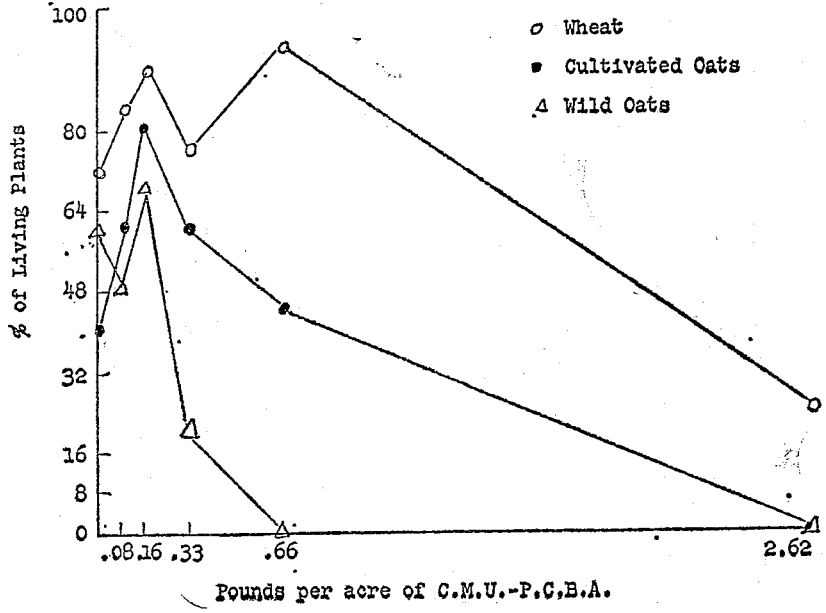

FIGURE 1.—RESPONSE OF THREE PLANTS TO OIL SOLUTIONS OF C.M.U.-P.C.B.A.
[Four weeks after germination]

It will be noted that the wild oats were completely killed when the spray contained 0.66 lb. per acre of the herbicide whereas there was practically no effect on the number of living wheat plants at this rate. The effect on cultivated oats falls in between that shown for the other two crops with a 55% mortality being demonstrated.

To summarize, highly effective herbicidal results may be obtained from compositions containing greatly reduced concentrations of active ingredients when the C.M.U.-P.C.B.A. derivative is employed. Additional amounts of either C.M.U. or P.C.B.A. may be used with the reacted amounts if desired. Other substituted ureas having a different herbicidial effect may be reacted with P.C.B.A.

The herbicidal effect of the C.M.U.-P.C.B.A. derivative demonstrates highly valuable selective heribicidal effects when extremely low concentrations of this new product are employed, thus offering an effective method for controlling the growth of wild oats in cereal producing areas.

The large reduction in the use of expensive active ingredients will thus provide a herbicidal composition economically feasable for wide scale application.

In view of the negligible herbicidal effect of cut-back asphalt when employed alone, it is apparent that a synergistic effect is achieved when the C.M.U.-P.C.B.A. product is employed in this medium.

What is claimed is:

1. A composition of matter prepared by heating a mixture of chlorobenzoic acids selected from the group consisting of 2,5-dichlorobenzoic acid, 2,3,5-trichlorobenzoic acid, 2,3,4,5-tetrachlorobenzoic acid and 2,3,5,6-tetrachlorobenzoic acid said mixture of acids having a melting point of about 180° F. and an average molecular weight of about 200 to above 180° F., and admixing with such acids 3-p-chlorophenyl-1,1-dimethyl urea in an amount sufficient to provide a urea to acid ratio of 1 to 1.

2. A composition of matter comprising in combination a mineral oil selected from the class consisting of gas oils and cut-back asphalt oils having Saybolt furol viscosities of 10 to 90 seconds at 77° F. and a herbicidal amount of a reaction product prepared by admixing 3-p-chlorophenyl-1,1-dimethyl urea with a mixture of polychlorobenzoic acids consisting essentially of 2,5-dichloro-, 2,3,5-trichloro-, 2,3,4,5-tetrachloro- and 2,3,5,6-tetrachlorobenzoic acids, said mixture of acids having a melting point of about 180° F. and an average molecular weight of about 200 at a temperature of above about 180° F.

3. A composition in accordance with claim 2 wherein said reaction product comprises from 0.1 wt. percent to about 25.0 wt. percent of said composition.

4. A method for sterilizing soil to control the growth of unwanted vegetation which comprises applying to the area on which vegetation is to be controlled a composition comprising about 0.1 to 25.0 weight percent of the reaction product obtained by reacting at least an equimolar amount of 3-p-chlorophenyl-1,1-dimethyl urea with a molten mixture of polychlorobenzoic acids consisting essentially of 2,5-dichloro-, 2,3,5-trichloro-, 2,3,4,5-tetrachloro- and 2,3,5,6-tetrachlorobenzoic acids, said mixture of acids having a melting point of about 180° F. and an average molecular weight of about 200, and as a carrier therefor, a mineral oil selected from the class consisting of gas oils and cut-back asphalt oils.

5. The method of claim 4 wherein said mineral oil is a gas oil boiling in the range of from 442° to 596° F. and containing at least 65 weight percent aromatic hydrocarbons.

6. The method of claim 4, wherein said mineral oil is prepared by blending an 85–100 penetration asphalt having a softening point of about 112° F. with a straight run naphtha to give a Saybolt furol viscosity of 48 at 77° F.

References Cited in the file of this patent

UNITED STATES PATENTS

| | | |
|---|---|---|
| 2,414,640 | Fischer | Jan. 21, 1947 |
| 2,683,659 | Schlesinger et al. | July 13, 1954 |
| 2,709,648 | Ryker et al. | May 31, 1955 |
| 2,726,947 | Baumgartner | Dec. 13, 1955 |
| 2,741,550 | Emond et al. | Apr. 10, 1956 |
| 2,782,112 | Gilbert et al. | Feb. 19, 1957 |
| 2,801,911 | Gilbert et al. | Aug. 6, 1957 |
| 2,847,462 | Sieger | Aug. 12, 1958 |
| 2,848,470 | Girard et al. | Aug. 19, 1958 |

FOREIGN PATENTS

| | | |
|---|---|---|
| 28,656 | Great Britain | Mar. 12, 1903 |

OTHER REFERENCES

Zimmerman et al., in Contrib. Boyce Thompson Inst., vol. 116, January–March 1951, pp. 209 to 213 incl.

Jones et al., in Biochemical Journal, vol. 48, No. 4, 1951, pp. 422–5.